United States Patent
Venkatesh et al.

(10) Patent No.: US 10,459,769 B2
(45) Date of Patent: Oct. 29, 2019

(54) ELASTIC CONTAINER MANAGEMENT SYSTEM

(71) Applicant: Unisys Corporation, Blue Bell, PA (US)

(72) Inventors: Prithvi B Venkatesh, Bangalore (IN); Krishna Kishore, Bangalore (IN); Pramod Mekapothula, Tempe, AZ (US)

(73) Assignee: Unisys Corporation, Blue Bell, PA (US)

( * ) Notice: Subject to any disclaimer, the term of this patent is extended or adjusted under 35 U.S.C. 154(b) by 117 days.

(21) Appl. No.: 15/668,919

(22) Filed: Aug. 4, 2017

(65) Prior Publication Data

US 2019/0042321 A1 Feb. 7, 2019

(51) Int. Cl.
*G06F 9/455* (2018.01)
*G06F 9/50* (2006.01)

(52) U.S. Cl.
CPC ........ *G06F 9/5077* (2013.01); *G06F 9/45533* (2013.01); *G06F 9/45558* (2013.01); *G06F 9/505* (2013.01); *G06F 9/5083* (2013.01)

(58) Field of Classification Search
CPC .. G06F 9/5077; G06F 9/5083; G06F 9/45558; G06F 9/505
See application file for complete search history.

(56) References Cited

U.S. PATENT DOCUMENTS

| 7,543,296 | B2 * | 6/2009 | Hunt ..................... | G06F 3/0605 709/224 |
| 7,814,491 | B1 * | 10/2010 | Chen ..................... | G06F 9/5016 709/226 |
| 8,464,267 | B2 * | 6/2013 | Uyeda .................. | G06F 9/5044 718/105 |
| 8,468,548 | B2 * | 6/2013 | Kulkarni ............... | G06F 9/5061 709/213 |
| 9,256,467 | B1 * | 2/2016 | Singh .................... | G06F 9/5055 |
| 9,678,773 | B1 * | 6/2017 | Wagner ............... | G06F 9/45533 |
| 9,858,123 | B1 * | 1/2018 | Dailianas ............. | G06F 9/45558 |
| 9,888,067 | B1 * | 2/2018 | Yemini ................ | H04L 67/1023 |
| 9,971,655 | B1 * | 5/2018 | Li ........................ | G06F 11/1451 |
| 10,191,778 | B1 * | 1/2019 | Yang .................... | G06F 9/5055 |
| 10,223,276 | B2 * | 3/2019 | Tsirkin ................ | G06F 12/0875 |

(Continued)

OTHER PUBLICATIONS

Vaughan-Nichols, Steven. "Containers vs. virtual machines: How to tell which is the right choice for your enterprise". ITworld. Apr. 28, 2015.*

(Continued)

*Primary Examiner* — Adam Lee

(57) ABSTRACT

An Elastic Container Management System (ECMS) that performs lifecycle management of containers by which containers are created, deleted, started, and stopped. The ECMS monitors the containers and, based on resource utilization, scales up and scales down the resource allocation of the containers. The ECMS also performs garbage collection, which removes containers from the host and their images and configurations are stored in repository, which can be retrieved. The ECMS also performs migration of containers between hosts in a network when the host running the container runs out of the resources.

23 Claims, 12 Drawing Sheets

(56) References Cited

U.S. PATENT DOCUMENTS

| | | | | |
|---|---|---|---|---|
| 2002/0154017 A1* | 10/2002 | Farner | ................. | B28C 7/00 |
| | | | | 340/612 |
| 2003/0004744 A1* | 1/2003 | Greene | ......... | G06Q 10/063112 |
| | | | | 705/1.1 |
| 2008/0250407 A1* | 10/2008 | Dadhia | ............. | G06F 9/45533 |
| | | | | 718/1 |
| 2010/0070784 A1* | 3/2010 | Gupta | ................. | G06F 1/3203 |
| | | | | 713/310 |
| 2012/0060171 A1* | 3/2012 | Bobroff | ................. | G06F 9/505 |
| | | | | 718/105 |
| 2012/0096455 A1* | 4/2012 | Katsumata | ............... | G06F 8/61 |
| | | | | 717/177 |
| 2012/0174113 A1* | 7/2012 | Pohlmann | ............ | G06F 9/5088 |
| | | | | 718/104 |
| 2013/0055252 A1* | 2/2013 | Lagar-Cavilla | ....... | G06F 9/5016 |
| | | | | 718/1 |
| 2013/0326506 A1* | 12/2013 | McGrath | ............. | G06F 9/45558 |
| | | | | 718/1 |
| 2013/0326507 A1* | 12/2013 | McGrath | ............. | G06F 9/4856 |
| | | | | 718/1 |
| 2014/0007097 A1* | 1/2014 | Chin | ................. | G06F 9/45533 |
| | | | | 718/1 |
| 2014/0068611 A1* | 3/2014 | McGrath | ............. | G06F 9/45533 |
| | | | | 718/1 |
| 2014/0282581 A1* | 9/2014 | Vonteddu | ............. | G06F 9/5011 |
| | | | | 718/104 |
| 2015/0052522 A1* | 2/2015 | Chanda | ................. | G06F 9/455 |
| | | | | 718/1 |
| 2015/0058863 A1* | 2/2015 | Karamanolis | ......... | G06F 9/5083 |
| | | | | 718/105 |
| 2016/0092250 A1* | 3/2016 | Wagner | ............... | G06F 9/45558 |
| | | | | 718/1 |
| 2016/0182315 A1* | 6/2016 | Salokanto | ........... | H04L 41/5054 |
| | | | | 709/226 |
| 2016/0212012 A1* | 7/2016 | Young | .................... | H04L 41/14 |
| 2016/0212128 A1* | 7/2016 | Pike | ........................ | H04L 63/10 |
| 2016/0261716 A1* | 9/2016 | Khalaf | ................ | H04L 67/1002 |
| 2016/0352582 A1* | 12/2016 | Itsumi | ..................... | H04L 41/22 |
| 2016/0359955 A1* | 12/2016 | Gill | ..................... | H04L 67/1097 |
| 2016/0371108 A1* | 12/2016 | Madtha | ............... | G06F 9/45558 |
| 2016/0378519 A1* | 12/2016 | Gaurav | ................ | G06F 9/5077 |
| | | | | 718/1 |
| 2017/0031698 A1* | 2/2017 | Mathews | ............ | G06F 9/45558 |
| 2017/0063722 A1* | 3/2017 | Cropper | ................ | G06F 16/285 |
| 2017/0116042 A1* | 4/2017 | Xu | ........................ | G06F 9/5083 |
| 2017/0126506 A1* | 5/2017 | Padala | .................. | G06F 9/5083 |
| 2017/0142194 A1* | 5/2017 | Bolshakov | .......... | H04L 67/1002 |
| 2017/0168715 A1* | 6/2017 | Eshwarappa | ....... | G06F 9/45558 |
| 2017/0199770 A1* | 7/2017 | Peteva | .................. | G06F 9/5088 |
| 2017/0366405 A1* | 12/2017 | Ganesan | ............ | H04L 41/0896 |
| 2018/0060125 A1* | 3/2018 | Bhimani | ................. | G06F 9/455 |
| 2018/0088978 A1* | 3/2018 | Li | ....................... | G06F 9/45558 |
| 2018/0088993 A1* | 3/2018 | Gerdesmeier | ......... | G06F 9/5005 |
| 2018/0113734 A1* | 4/2018 | Yamato | .................. | H04L 67/10 |
| 2018/0157517 A1* | 6/2018 | Dong | ................. | G06F 9/45558 |
| 2018/0189152 A1* | 7/2018 | B S | ...................... | G06F 11/2007 |
| 2018/0285165 A1* | 10/2018 | Helsley | ................ | G06F 9/5077 |
| 2018/0287883 A1* | 10/2018 | Joshi | ...................... | G06F 9/455 |
| 2018/0288129 A1* | 10/2018 | Joshi | ....................... | H04L 43/08 |

OTHER PUBLICATIONS

Wong, William G. "What's the Difference Between Containers and Virtual Machines?" ElectronicDesign. Jul. 15, 2016.*

Coleman, Mike. "So, when do you use a Container or VM?" May 13, 2016.*

* cited by examiner

| Total available memory = 1 GB | | |
|---|---|---|
| Demand of container1 = 1 GB | Demand of container2 = 2 GB | Demand of container3 = 1 GB |
| Incremental allocation = ¼ * 1 | Incremental allocation = 2/4 * 1 | Incremental allocation = ¼ * 1 |
| 0.25 GB | 0.5 GB | 0.25 GB |

Figure 2

Garbage collector interaction with dependent components in ECMS

Figure: Components of Elastic Docker Container Management system

ELASTIC CONTAINER MANAGEMENT SYSTEM

BACKGROUND OF THE INVENTION

1. Field of the Invention

The present invention relates to running containers on hosts and more particularly to assigning and scaling resources used by the containers.

2. Description of the Related Art

Operating-system-level virtualization is a computer virtualization method in which the kernel of an operating system allows the existence of multiple isolated user-space instances, instead of just one. Such instances, are known as containers. Containers look like real computers from the point of view of programs running in them.

Containers have different resource requirements. Resource requirements include, but are not limited to, CPU usage, memory usage, bandwidth allocation, network usage, and the like based on the type of applications running on them. A container running a mail server would have different resource requirements than a container running a video streaming server. Predicting resource requirements for a container is difficult.

Current implementation of Docker, which is a form of virtualization in which Virtual Machines (VM) allow a piece of hardware to be split up into different VMs, or virtualized, so that hardware power can be shared among different users and appear as separate servers or machines. Docker's containers support fixed resource allocation of CPU share, RAM/memory, and network bandwidth, but does not support dynamic scaling of resource requirements. For applications running on the container that require more than the allocated resources, another container with the same image has to be started to increase resource allocation. Starting additional containers causes service disruptions when the containers are switched.

In test and development environments developers and testers spin up containers perform their activities. Once their work is done they, they typically forget about the containers, which leads to container sprawl and wasteful resource utilization of the container host and in turn increase the power consumption and maintenance cost.

SUMMARY OF THE INVENTION

One aspect of the present invention overcomes the problem of fixed resource allocation of resources including CPU, Memory, network bandwidth, and the like for containers and to prevent a service disruption during container switch, by dynamically sealing up or scaling down the resources (CPU/Memory/Network) of container based on resource utilization of the container, without disrupting the one or more services running on the container.

One aspect of the invention is an Elastic Container Management System (ECMS). ECMS is a new platform architecture that performs lifecycle management of containers, which includes creating, deleting, starting, and stopping containers, monitors the containers, and, based on resource utilization of the containers, scales up and/or scales down the resource allocation of the containers.

In one embodiment, the ECMS perform garbage collection. Garbage collection comprises idle containers being removed from the host with their images and configurations are stored in a repository. The image and configuration can be retrieved to bring back the container to the same desired state.

In one embodiment, the ECMS performs migration of one or more containers between hosts in a network when a host running the container runs out of the resources.

In one embodiment, the ECMS performs lease management of containers by associating a lease to a container when the container is created. When the lease for the container expires, the container image and configuration is archived. The image and configuration can be retrieved to bring back the container to the same desired state.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 2 is an example of proportional allocation of resources;

DETAILED DESCRIPTION OF THE PRESENTLY PREFERRED EMBODIMENTS

The disclosed Elastic Container Management System (ECMS) is a new platform architecture that performs life cycle management, utilization balancing, garbage collection, and lease management of containers.

The ECMS performs lifecycle management of containers, which includes creating containers, deleting containers, starting containers, and stopping containers. The ECMS is also configured to monitor the containers and, based on resource utilization, scale up and/or scale down the resource allocation of the containers on the same host and on different hosts. The ECMS also performs garbage collection where idle containers are removed from the host and their images and configurations are stored in a repository so that they can be retrieved later to the same desired state. The ECMS also performs lease management of containers by associating lease to a container when it is created and when the lease expires for the container, the container image and configuration gets archived. The ECMS also performs migration of containers between hosts in a network when the host running the container runs out of the resources.

A first responsibility of the ECMS is the scaling up, scaling down, and sharing of resources amongst the containers on a same host machine. For Docker or other containers that have a fixed resource allocation of resources, the resource utilization of the Docker container spikes during events such as flash sales on ecommerce sites hosted on a container or events like September 11th resulting in more resource utilization of news sites hosted on the container.

To address utilization, resources among demanding are dynamically increased and/or decreased. A proportional allocation of the resource requirements including, but are not limited to, CPU usage, memory usage, bandwidth allocation, network usage, and the like.

Figure 1:
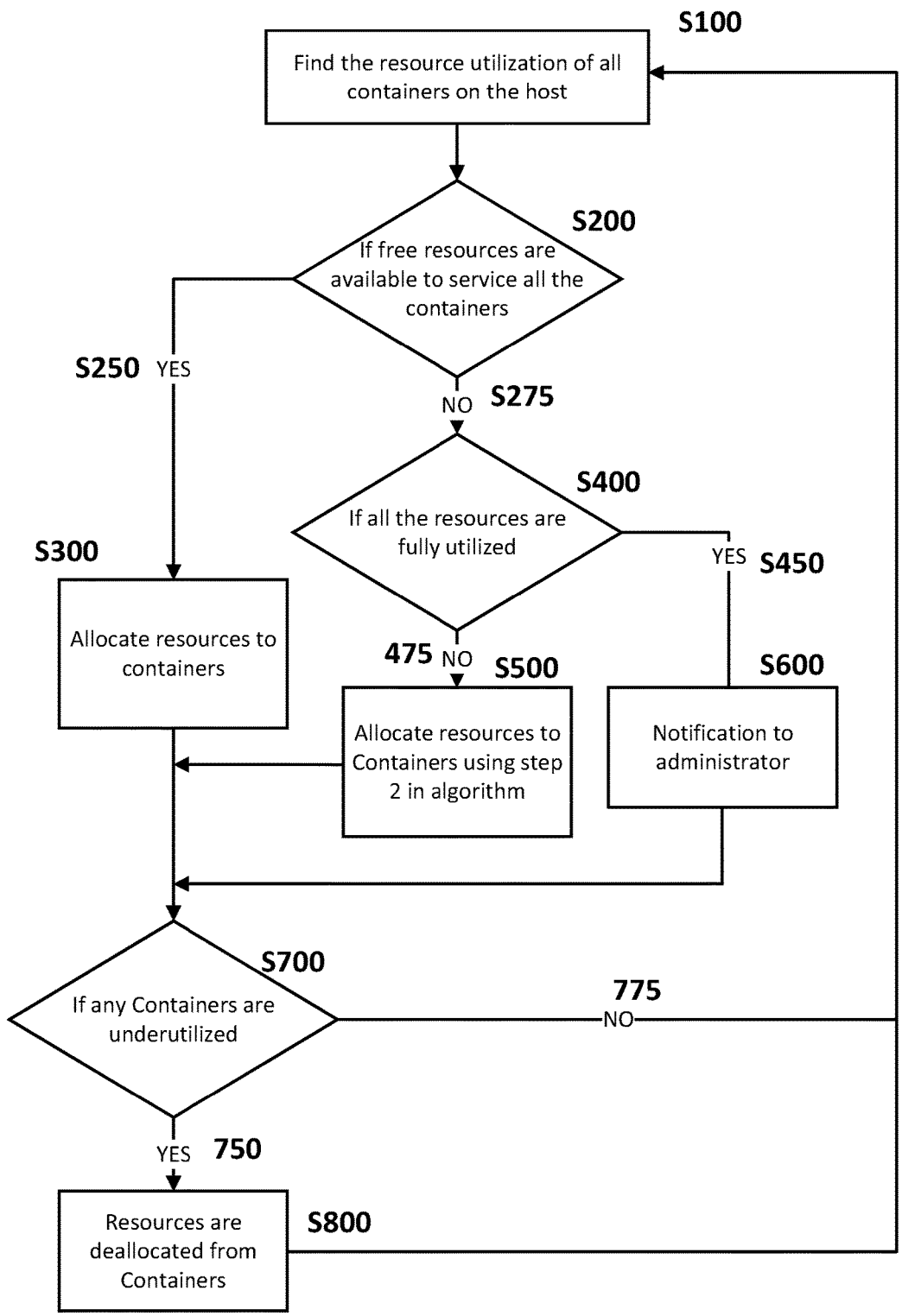
FIG. 1 is a flowchart for the allocation of resources.

FIG. 1 is a flowchart for the allocation of resources. While the allocation of resources is discussed with respect to a single host, it should be noted that the ECMS function across multiple hosts. At a step S100 the ECMS finds the resource allocation for all containers on a host. The ECMS determines if there are free resources available to service all of the containers at step S200. If enough free resources are available to satisfy the all of the containers that require one or more resources (250), resources are allocated to the containers at S300. If enough free resources are available to satisfy the all the containers which require a resource, resources are assigned to the container and the corresponding free resource from the free pool are decreased. According to one aspect of the invention, resource allocation is increased for those containers whose resource utilization is about 95 percent of its allocated resource and less than a maximum resource limit for the container.

If there are not enough free resources available to satisfy the all of the containers that require one or more resources (275), the ECMS determines if all of the resources of a host are fully utilized at step S400. If all of the resources are fully utilized (450) a notification is sent to the Administrator at step S600. This notification triggers a determination if any containers are underutilized at step S700. Underutilization occurs when less than 80 percent of the resources allocated for a container are utilized. If the resource utilization for a given container is less than 80 percent of the allocated resource and greater than a minimum resource limit of the container, allocated resources for the container are decreased (deallocated) thereby increasing the free resource available in the free resource pool.

If all of the resources are not fully utilized or not enough free resource are available to satisfy all the containers (475) resources are increased for the containers using incremental resource allocation in step S500. Incremental resource allocation is a ratio of actual resource required by the container to total resource required by all containers times the total free available resource. The equation is:

$$\text{Incremental resource allocation} = \frac{\text{Actual resource required by the Container}}{\text{Total resource required by all Containers}} \times \text{Total free available resource}$$

After incremental resource allocation in step S500 the determination if any containers are underutilized at step S700 is performed. If there are no underutilized containers (775) the ECMS returns to step S100 and determines the resource allocation for all containers on a host. If there are underutilized containers (750) the ECMS deallocates resources from those containers that are underutilizing those resources at step S800. Once resources are deallocated, the ECMS returns to step S100 and determines the resource allocation for all containers on a host so the process can begin again.

The ECMS addresses the three conditions, which are:
when there are enough free resources is available to satisfy the all the containers that require resource,
when there are not enough free resource available to satisfy all the containers, and
when incremental resource allocation is required.

FIG. 2 is an example of proportional allocation of resources. The resource being allocated is memory. In this example, the host has a total available memory of 1 GB and there are three containers requiring memory on the host. Containers 1 and 3 each have a demand 1 GB of memory and container 2 has a demand of 2 GB. The total demand of 4 GB exceeds the host resources of 1 GB. The ECMS applies the incremental allocation equation. Using the incremental allocation equation, Containers 1 and 3 each have an allocation of 0.25 GB of memory and container 2 has an allocation of 0.5 GB.

The ECMS can also operate across multiple host machines. Generally the ECMS can scale up and/or scale down containers across different host machines. To respond to high resource utilization of a given container, ECMS will respond by scaling up the resources allocated to the container. However, as utilization increases, there will be a point when the host runs out of available resources. In response, the container or containers are scaled out across different hosts that have sufficient resources available. Specifically, to overcome the problem of a host running out of resources, an exact copy of a container is created on another host with help of Docker images and Chef recipes to bring the copied containers to the exact same state as the original.

Figure 3:
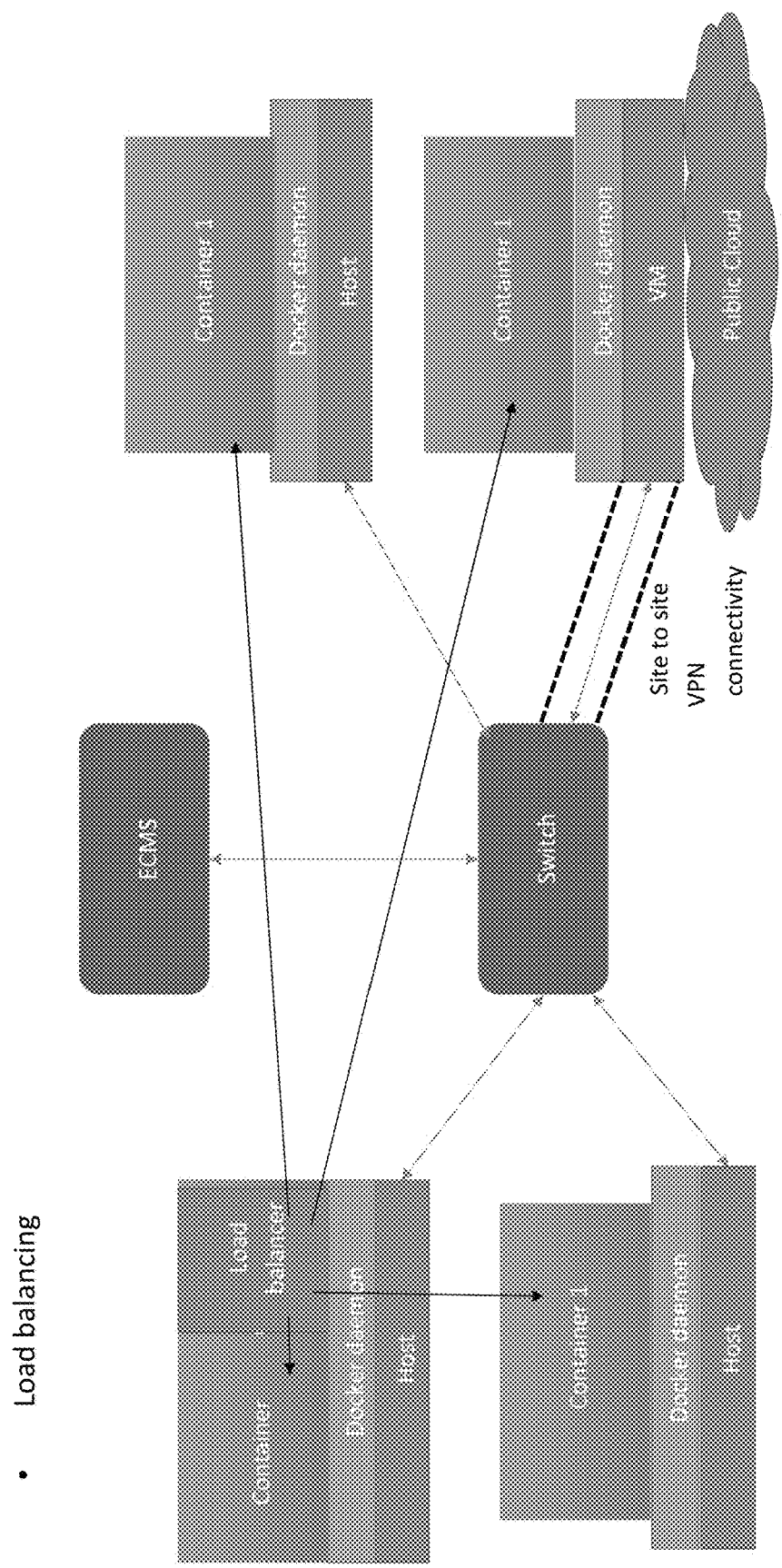
FIG. 3 is load balancing on a host.
Figure 4:
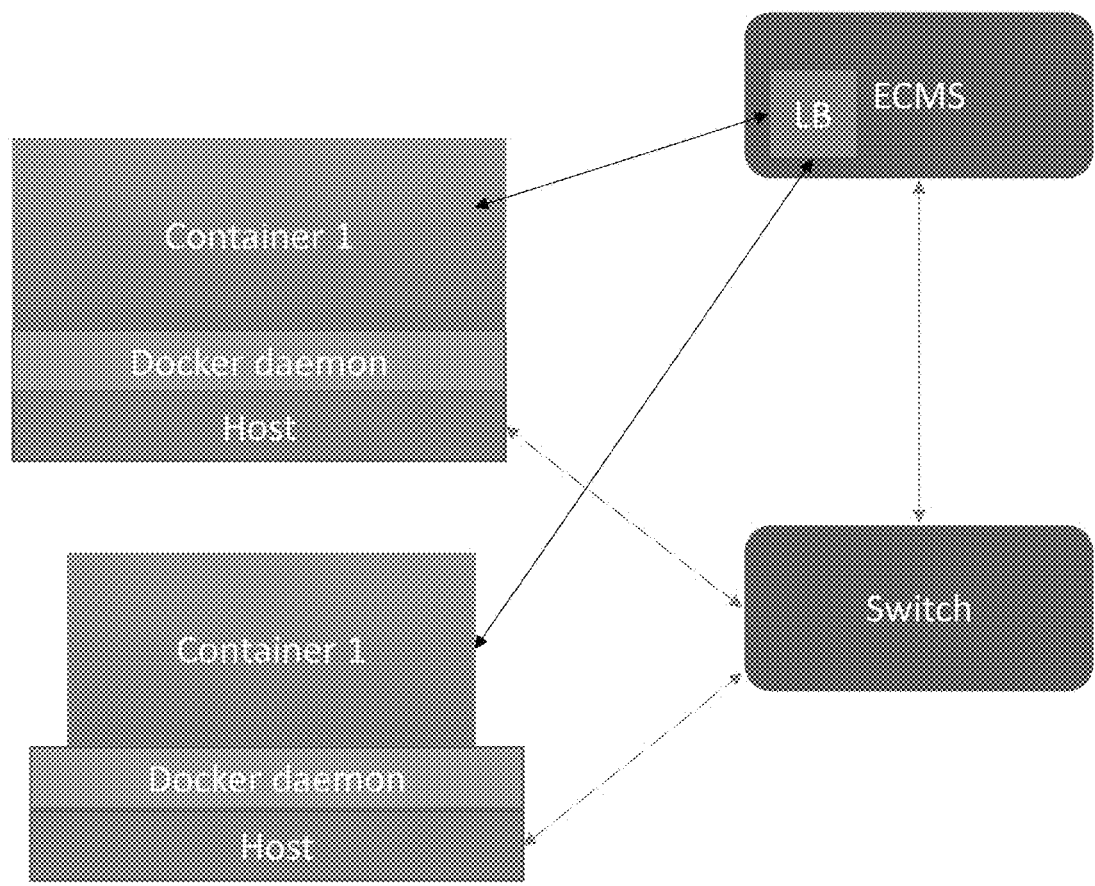
FIG. 4 is load balancing by ECMS.

There are two approaches for allocation, load balancing on a host and load balancing by the ECMS. The distinction, as seen in FIGS. 3 and 4 are where the load balancer is resident. In FIG. 3, which is load balancing on a host, the load balancer is resident on the host. In FIG. 4, which is load balancing by the ECMS, the load balancer is resident on the ECMS.

To overcome the problem of host running out of resources, the size of the container is reduced by scaling down the allocated resources of the container a load balancing container is spun up. A copy of the original container is then spun up on one or more hosts that have free resources using Docker images. The load balancing container gets all the resource requests and distributes available resources amongst the newly replicated containers. The new containers on the one or more hosts is brought to the same state as the original container using Chef recipes or the like. It should be noted that all the hosts have a Chef-client or the like installed.

Chef or similar applications provide for local, decentralized development of application software, Chef cookbooks, Docker repositories, system configuration including user authentication, alerts, logs, stats, NTP, and the like, and load balancer health checks and settings. Chef also allows for the same provisioning script used for a local container to be spun up and run oil other hosts.

Load balancing occurs when the resources for a host of a container, referred to as the original container, are fully utilized a scheduler identifies the least loaded host. The original container is scaled down to accommodate a load balancer. Once the load balancer is created the original container's IPaddress:port is registered with the load balancer. According to one aspect of the invention, the IPaddress:port of container is mapped to IPaddress:port of the host to expose a service. The mapping is updated to IPaddress:port of the load balancer, which is mapped to the IPaddress:port of the host, so that all the traffic is redirected to load balancer. The original container is imaged and associated recipes are pushed to an image manager and downloaded on to the new host where the container is to be replicated to create a new container, referred to as a duplicate container. Once downloaded, the duplicate container is started and the recipes are applied. The duplicate container's IPaddress:port is registered with the load balancer. At this time, all requests that comes to the load balancer are distributed between the registered (original and duplicate) containers.

According to one aspect of the invention, load balancing is handled by the ECMS as shown in FIG. 4. As shown in FIG. 4, the scaling manager creates a load balancer in the ECMS. As discussed above, the load balancer is responsible for load balancing of the containers.

A specific application of the ECMS is a container bursting into public clouds from a private data center and vice versa. As discussed above, ecommerce sites have frequent flash sales with high discounts or news sites have increased visits. In these situations, a large number of people visit these sites. Eventually, there is a point at which the infrastructure hosting the site runs out of resources. Running out of resources results in a slow response from the site and a loss of requests.

To address this issue, one approach is to host the site on container and allow it to scale on the data center on which it is hosted. When this data center runs of resources the container is allowed to burst into a public cloud so the site is able to accommodate the huge request load. The expansion results in a smooth customer experience with lower infrastructure costs for the ecommerce site that has unusual high traffic during discount sales or the news site on a high volume day. Generally in ECMS, the container manger is responsible for monitoring of ECMS infrastructure. Whenever all the hosts attached to ECMS are running at 95% of resource utilization container bursting is enabled and administrator approvals are sought.

Figure 5:
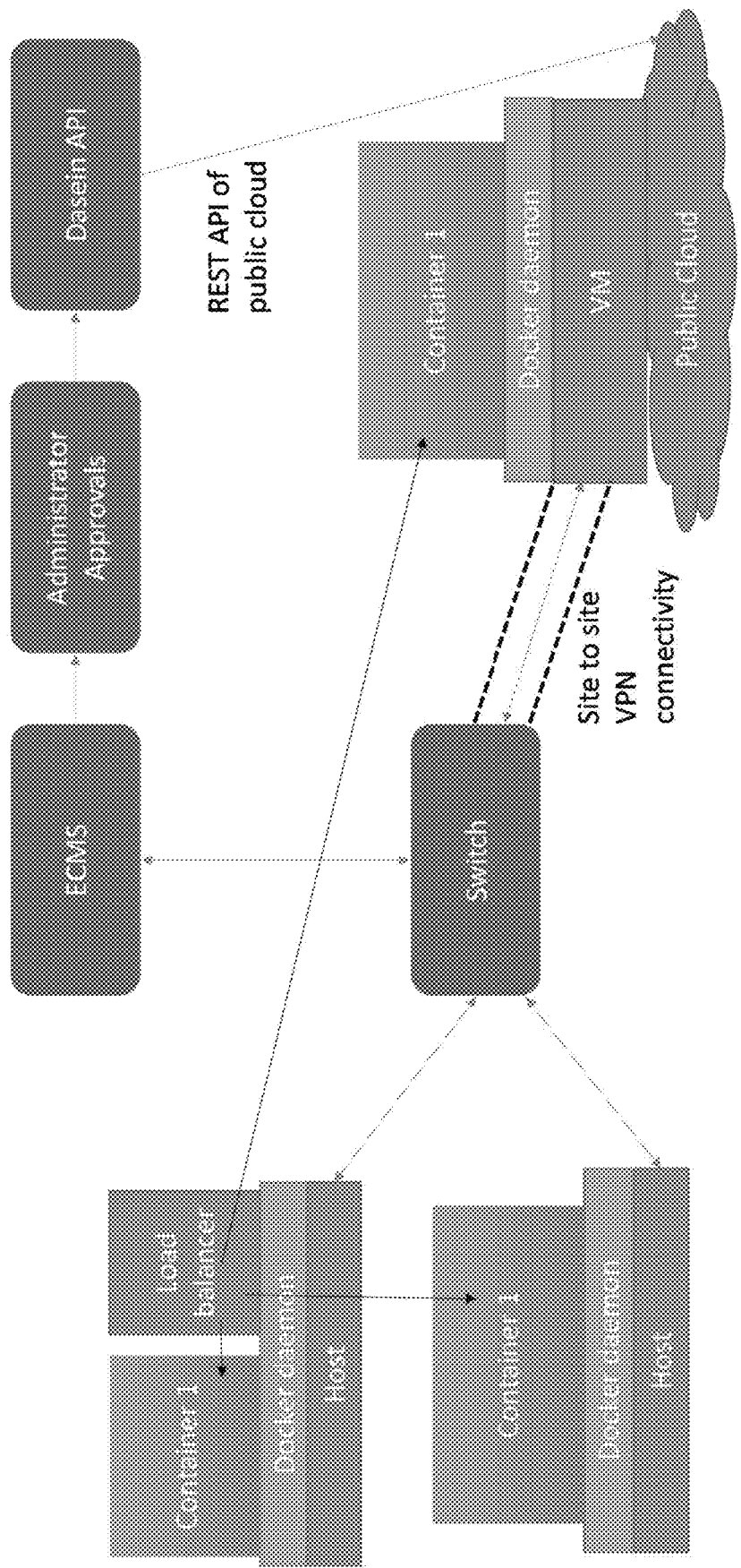
FIG. 5 is a container bursting into a public cloud from a private data center.

FIG. 5 depicts a container bursting into a public cloud from a private data center by dynamic VM creation. As discussed above, load balancing overcomes the problem of a host running out of resources by reducing the size of the container by a resource scale down and spinning up a load balancing container and a copy of the original container in the host which has free resources using Docker images concept. The new container is brought to the same state as the original with help of a chef recipe. The load balancing container gets all the requests and distributes them amongst the newly replicated containers. According to one aspect of the inventions, all of the hosts have a chef-client installed.

According to one aspect of the invention, a container bursts into public clouds through dynamic VM creation. In this scenario, a private data center where ECMS is resident will ran out of resources and the ECMS is running on a private data center. ECMS waits for administrator approval for container bursting. Once approval is obtained the container compute manager of the ECMS creates a VM in the public cloud provider based on demand. The VM is preferably created using the Dasein APIs which are a cloud abstraction API. Dasein APIs provide an abstraction for applications that wish to be written independent of the clouds they are controlling. Instead of writing code to a cloud-specific web services or Java API, the application is written against she Dasein Cloud API and plug in the implementation for the cloud to be used. This model is similar to many other Java standard APIs that provide an abstraction interface and drivers that handle the implementation details. The Dasein API sits in the container compute manager of the ECMS. ECMS registers the VM with the registry manager. ECMS also adds the VM to the network of private data center using site to site VPN connectivity. If not already present, the ECMS container compute manager installs the Docker host software on the VM. The ECMS then identifies the container whose utilization is full and images it and selects the container's corresponding scripts. A new container is created on the VM in the public cloud and the scripts are applied to bring the new container to the desired state. The new container is registered with the load balancer that is running in the private data center. Once the new container or new containers if more than one is created are registered, the load balancer distributes the load to the newly registered container(s).

Figure 6:
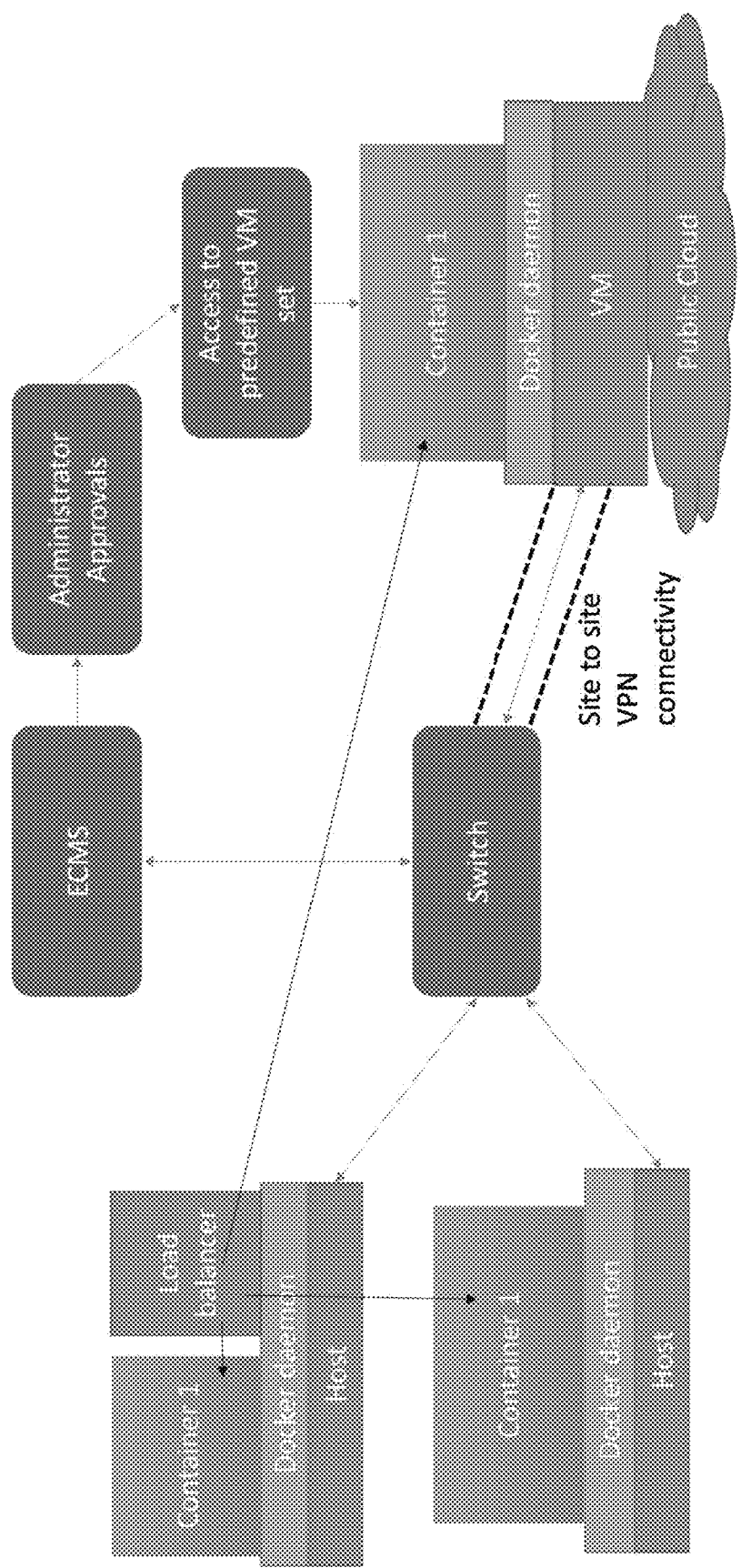
FIG. 6 is a container bursting into public cloud from private data center through a predefined set of VMs in a public cloud provided by administrator.

FIG. 6 is a container bursting into public cloud from private data center through a predefined set of VMs in a public cloud provided by an administrator according to one aspect of the invention. As discussed above, the private data center where ECMS runs will run out of resources. Here, ECMS has to wait for administrator approval for container bursting. Once approval is obtained the already created and ready VMs on public cloud with Docker hosts installed are available for container bursting. It should be noted that there is no lag time because VM creation is avoided because it has already occurred. The new hosts are then registered with ECMS. As discussed above, the container is replicated on the predefined VM on the public cloud and ECMS registers the container with the load balancer. The load balancer distributes the load to the newly registered container(s).

Figure 7:
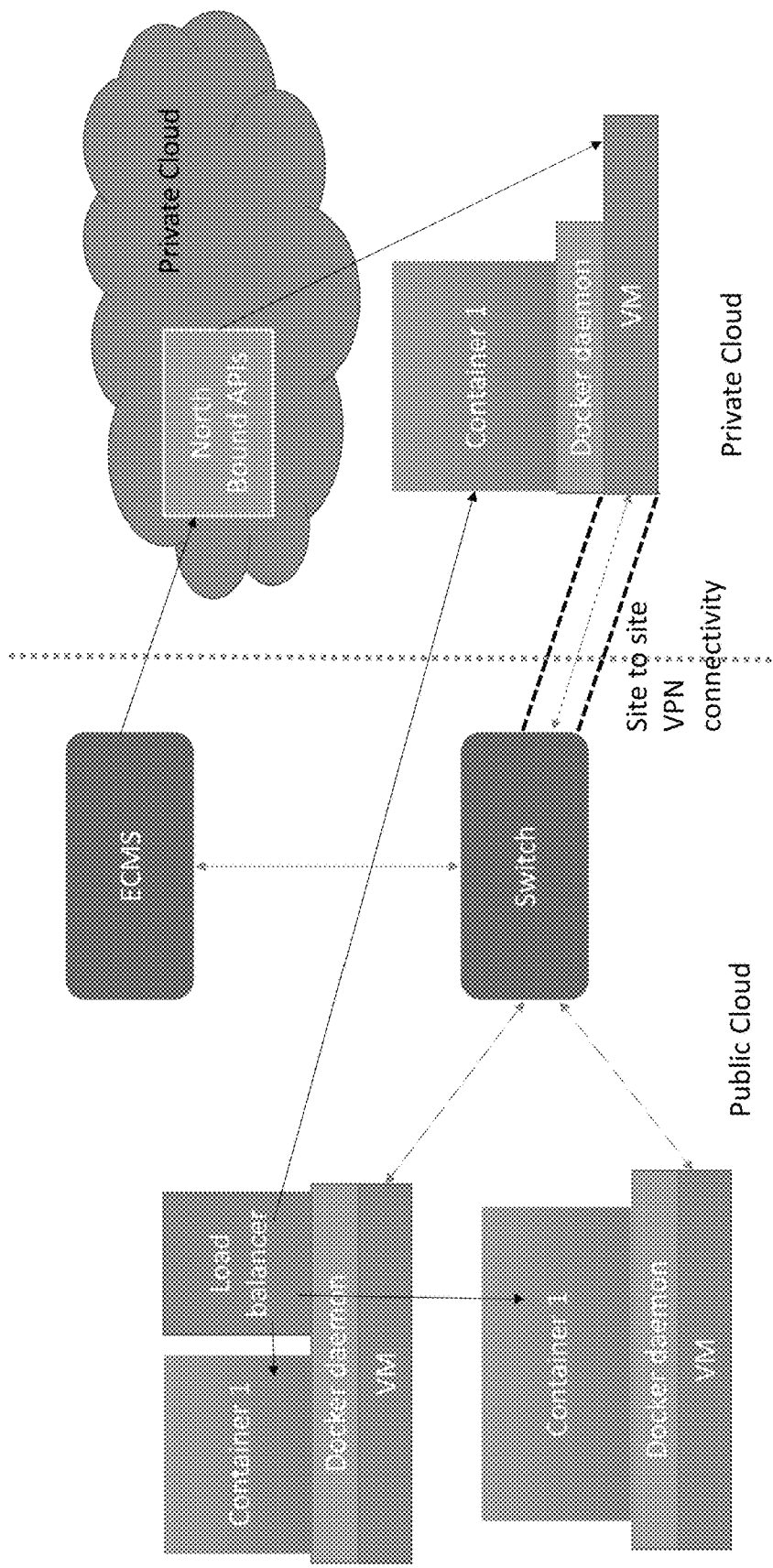
FIG. 7 is a container bursting into private cloud from public cloud.

FIG. 7 is a container bursting into private cloud from public cloud. According to one aspect of the invention, ECMS is running on the public cloud and the public cloud subscription resource utilization limit has been exceed. Additionally, the Elastic container management system is running on public data center. The container compute manager of the ECMS creates a VM in a private data center using its north bound APIs. North bound APIs are the APIs provided for the external world to access the private data center). The VM is created using the Dasein APIs. Once created, the ECMS registers the VM with the registry manager and adds the VM to the network of the public data center using site to site VPN connectivity. ECMS container compute manager installs the Docker host software on the VM. The ECMS identifies the container whose utilization is full, or which has reached a predefined limit, and images it and selects the corresponding scripts. One or more new containers are created on the VM in the private cloud and the scripts are applied to bring it to the one or more new containers to the desired state. The containers are registered with load balancer running in the public data center so it can distribute the load to the newly registered container(s).

Figure 8:
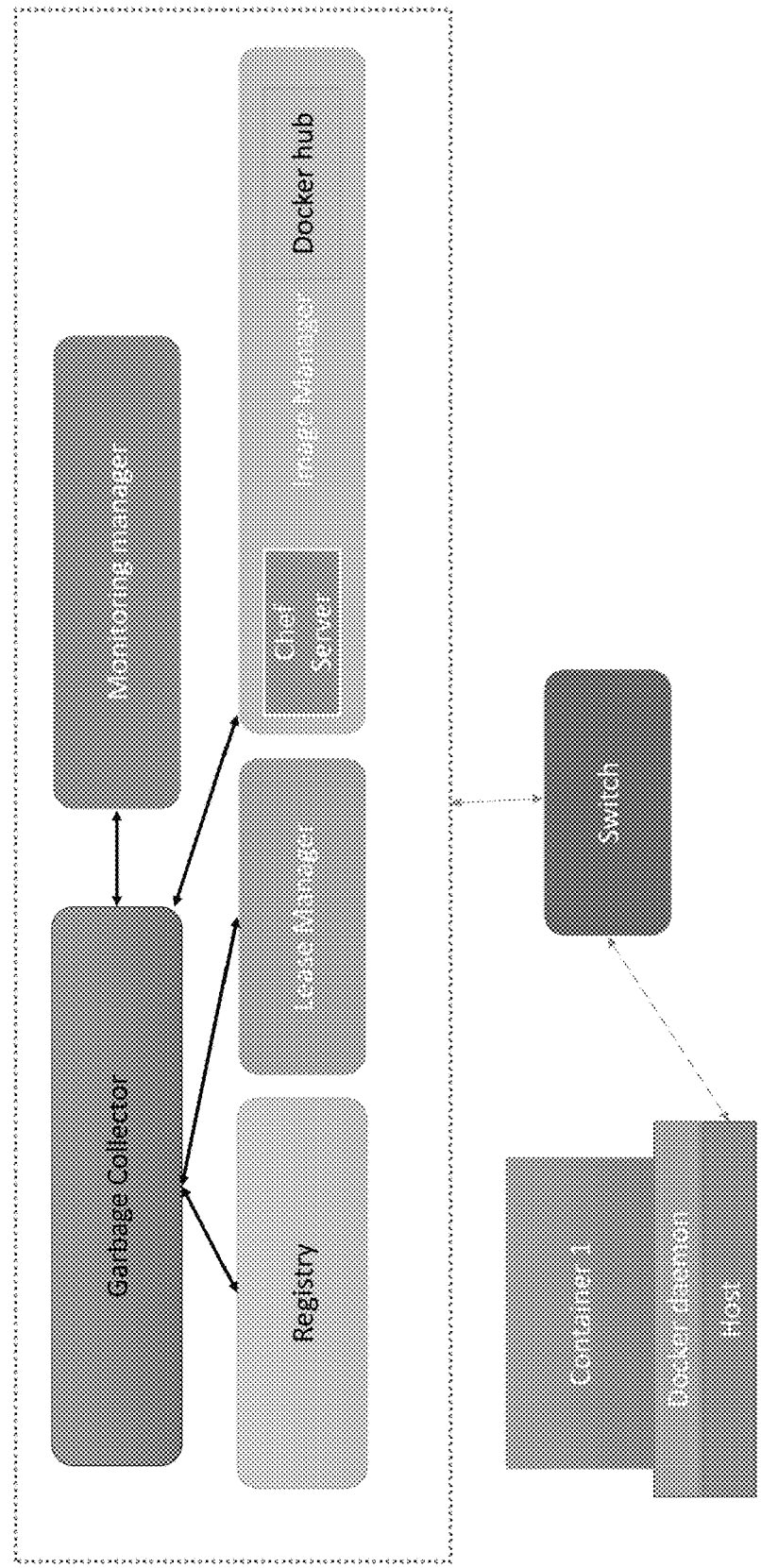
FIG. 8 is garbage collector.

According to one aspect of the invention, the ECMS includes a Garbage Collector. The Garbage Collector is used to clean up containers on a host. FIG. 8 depicts a garbage collector. There are several scenarios by which hosts running containers run out of resources including:

1. Resources occupied by unused stopped containers,
2. Resources occupied by unused Docker images, and
3. Resources occupied by idle containers.

The Garbage Collector cleans up stopped containers by imaging and storing the stopped container's images along with associated Chef recipes to bring the stopped and imaged container to the desired state when required. The Garbage Collector frees up resources by pushing the unused images to a hub on ECMS, or another storage location, and deletes them from the local repository. The Garbage Collector also stops idle containers and save their images and recipes in the repository or other storage Location.

According to one aspect of the invention, the Garbage Collector is invoked periodically at set time intervals. Alternatively, the Garbage Collector can be invoked thru the ECMS manually. The Garbage Collector invokes a monitoring block that identifies idle containers and unused images. The idle containers and stopped containers are imaged and corresponding chef recipes are created to maintain the desired state with dependent containers. The images and chef recipes are archived by storing them in a repository. The stopped and idle containers and their corresponding images are removed front the local host. The registry is updated with respect to the status of the removed containers. If there is a lease for any of the removed containers, the lease associated with the removed containers is updated.

In many situations, it is desirable to restart an archived container. When a user wants to start a stopped container The ECMS identifies the best host where it can be started, where the image and recipe, which is a collection of scripts, is downloaded and container is started. When doing such a migration connections to dependent containers with help of chef recipes should also be updated. The first step in restarting a container is identify the host(s) that has enough resource to accommodate the container. The archived image and recipes associated with the container on downloaded to the identified host(s). The container is then started and the recipes applied. Finally, the container is tested to insure that is functioning properly.

The ECMS also performs lease management for containers. In test and development environments developers and testers spin up a number of containers and after their work is done they usually forget to clean up the resources, which in turn result in more resource utilization, more power consumption, more cost to the company, and a greater carbon footprint. To address this issue, a lease is attached to a container when it is created, particularly in the test and development environment. When the lease expires a notification is sent to the user and/or administrator. If the user or administrator responds, the lease period associated with container is extended, otherwise the container image and associated recipe is archived.

During container creation a lease object is associated with the container. A lease period is selected by the user. The lease period can be configured to 1 week, 1 month, 2 months, 3 months, or it can customized to a user selected period. A timing for a pre-expiration notification can also be set by the user. Once the user selects the lease period and if desired, a pre-expiration notification, the lease period is updated in the registry against the resource. A lease tracking process continuously tracks the lease of each container by comparing current server time with lease expiration times. When the container lease period reaches the pre-expiration notification time, a pre-expiration notification is sent. The user has the opportunity to renew or extend the lease at this time. In one embodiment, when the container reaches its expiry period, an email notification is sent. The user can also renew or extend the lease at this time. If the user renews the lease, the lease period is updated in the registry and lease monitoring continues. If the user does not renew the lease, even after fixed time interval set by the administrator, an archive process takes place. Specifically, then the container is imaged, stopped, and its image is pushed to a Docker hub, which is a private repository located in the Image Manager of ECMS. Associated chef recipes are pushed into a chef server both of which is also located in the Image Manager of ECMS. Retrieving an archived container is similar to garbage collector retrieval process discussed above. It should be noted that during a scaling process across hosts, the newly replicated container inherits the same lease as its parents.

Figure 9:
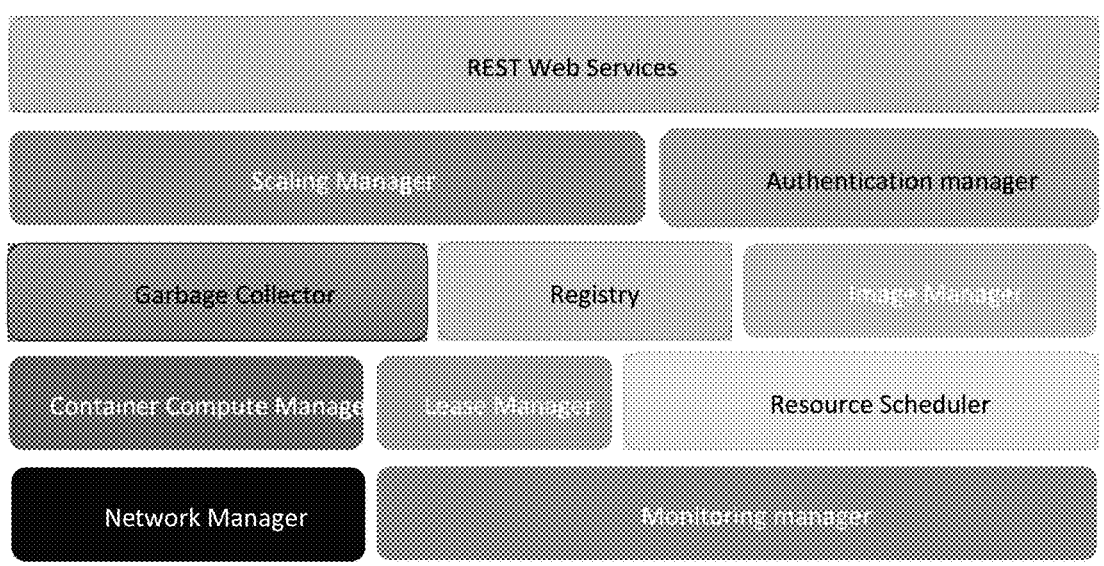
FIG. 9 depicts the components of an ECMS.

FIG. 9 depicts the components of the ECMS. The components include, but are not limited to REST web services, scaling manager, authentication manager, garbage collector, registry, image manager, container compute manager, lease manager, resource scheduler, network manager, monitoring manager, and the like. The authentication manager is responsible for Authentication and Authorization of hosts and users. The scaling manager scales up and/or scales down containers on a same host or across different hosts based on availability of resources. The registry includes metadata of all the hosts, containers, and users. The monitoring manager monitors resource utilization of containers and host. The image manager includes an image repository where images can be pushed and pulled. The image manager also contains the server configured to store scripts associated with containers. The garbage collector, as discussed above, cleans up unused images and idle containers. The container compute manager creates, deletes, starts and stops container. The lease manager, as discussed above, is responsible for leases associated with the containers. The resource scheduler is configured to identify hosts for container creation. The network manager is responsible for network scaling.

Authentication Manager

The authentication manager is responsible for authentication and authorization of hosts and users. The authentication manager exposes an API to authenticate a user. It is also responsible for authentication of Docker hosts based on an exchange of credentials or certificates exchanged. According to one aspect of the invention, the authentication manager encrypts container images and recipes while they are transmitted from a Docker hub to Docker hosts, which prevents security vulnerabilities on the fly. The authentication manager is also responsible for a logon process of users on a container and also maintains roles and permissions.

The authentication manager uses an authentication API. Using the authentication API a logged in user is authenticate against a Lightweight Directory Access Protocol (LDAP) and/or a local database. Once the authentication is successful a user object is created with all the required Meta data about the user. This user object will be updated in Registry. All actions done by this user will be logged against this user object. This user object exists as long as the user is logged in. In one embodiment, all operations will be updated to a database. The object provides quick access on the current logged in user and their operations.

Monitoring Block

The monitoring block is a module that monitors all the resources of a container, and its Host. The monitoring block also keeps track of services running in the container at the container level. The services running on containers are measured by a number of requests going thru the containers IPaddress:port combination. According to one aspect of the invention, the monitoring block keeps track of the containers running on the host and, if applicable, the hosts running in the network. The Monitoring information from the monitoring block is in other parts of the system for garbage collection and scaling up and down of resources. The monitoring block dynamically updates the registry regarding the status of services and containers in a host and updates the registry with resources utilization.

Registry

The registry is a module that keeps track of all the containers and host. The registry stores resource information including running and stopped services with respect to the containers. The registry also stores running and stopped containers with respect to hosts. The registry stores the resource origin information, which is the Docker host on which container is running. The registry is also configured to store one or more of the lease information, the scheduler information, the resource threshold limits, which are preferably minimum and maximum values, Host IP address\hostname, credentials, status of host resource utilization, and the scaled resource utilization of containers on a host.

Network Manager

The network manager is responsible for network scaling at host level. It is configured to establish point to point connection in case of virtual container creation. Network bandwidth is controlled based on IP address of the container at the network interface of the host by the network manager. Network bandwidth allocation uses traffic control commands to divide the network bandwidth among the containers. The network manager is also responsible for inter-host container networking.

Image Manager

The image manager is responsible for life cycle management of images. The image manager contains a Docker hub or the like, where all of the required images are stored. It also preferably contains a Chef server to store recipes associated with the containers. The garbage collector and lease manager use the image manager for container archival process. Container lifecycle management uses the image manager to pull images during container creation process.

Resource Scheduler

The resource scheduler is responsible for finding the list of least loaded hosts for container creation and scaling. The resource scheduler also takes the host's information from the registry and applies unused memory filter, unused CPU filter, and unused storage filter to get a list of hosts that have enough resources.

Container Compute Manager

The container compute manager provides APIs for creation, start, stop, and delete of containers, it also latches to the Docker host to perform lifecycle operations of the container. The container compute manager is also configured to function as the scaling manager because it acquires a list of hosts that haves sufficient resources to create the containers from the scheduler. If there are no additional host to which a container can be scaled, the container compute manager scales the container across hosts it uses. If a list of containers is obtained the container compute manager uses use case scaling across different hosts.

Figure 10:
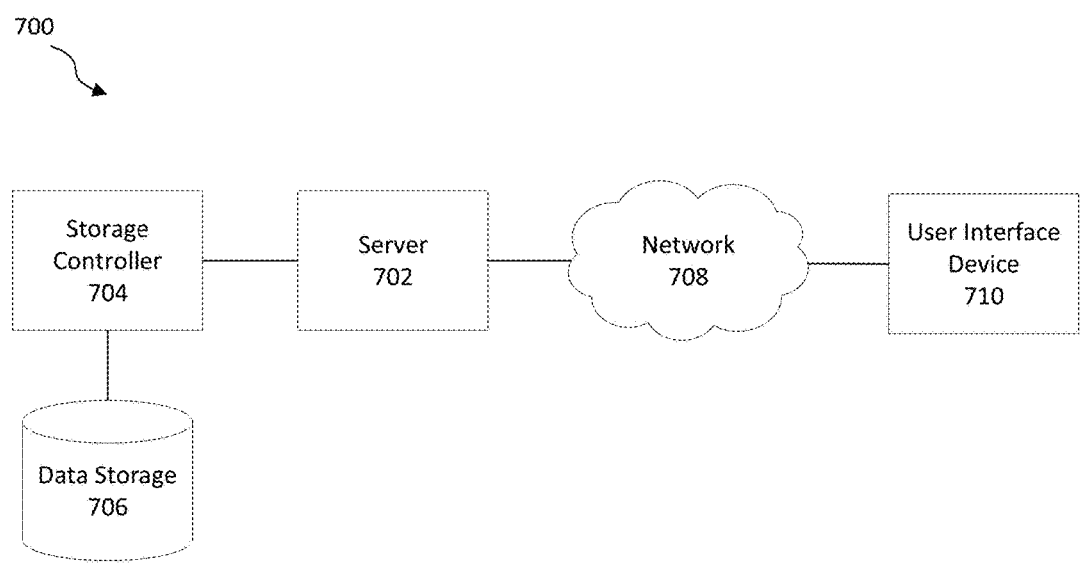
FIG. 10 is a block diagram illustrating a computer network according to one embodiment of the disclosure.

FIG. 10 illustrates one embodiment of a system 700 for an information system, including a system for hosting applications such as containers. The system 700 may include a server 702, a data storage device 706, a network 708, and a user interface device 710. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708.

In one embodiment, the user interface device 710 is referred to broadly and is intended to encompass a suitable processor-based device such as a server, desktop computer, a laptop computer, a personal digital assistant (PDA) or tablet computer, a smartphone, or other a mobile communication device having access to the network 708. In a further embodiment, the user interface device 710 may access the Internet or other wide area or local area network to access a web application or web service hosted by the server 702 and may provide a user interface for enabling a user to modify policy information for a container.

The network 708 may facilitate communications of data between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 11:
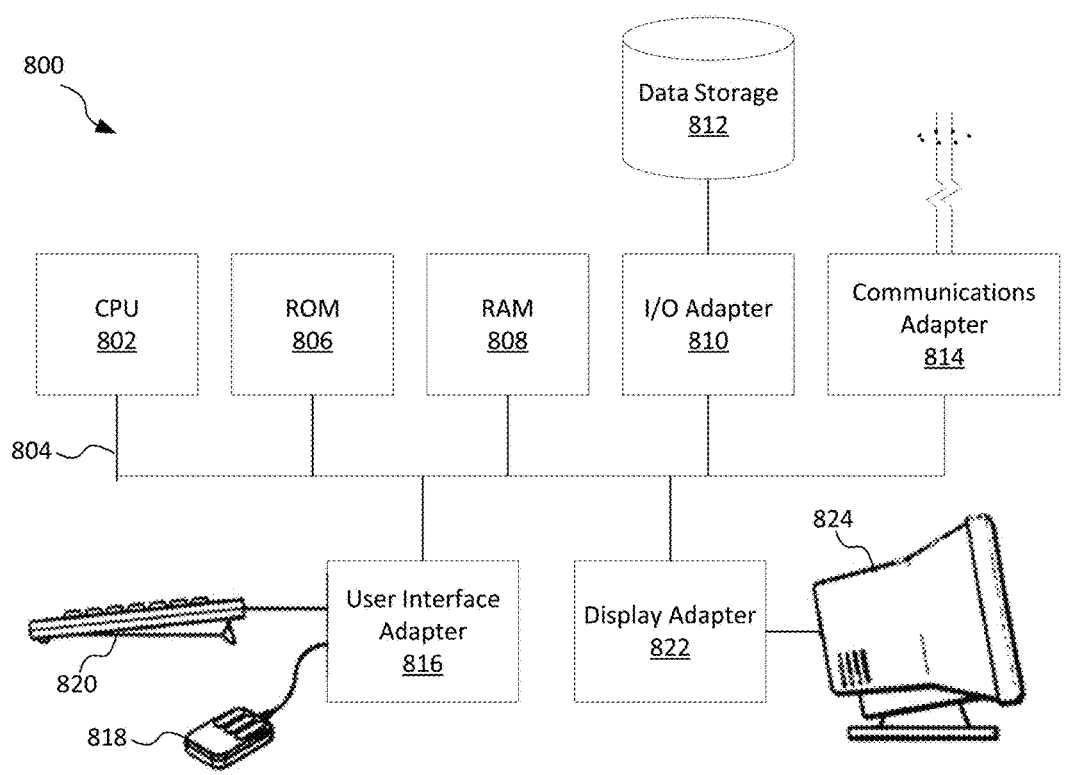
FIG. 11 is a block diagram illustrating a computer system according to one embodiment of the disclosure.

FIG. 11 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The user interface adapter 816 couples user input devices, such as a keyboard 820, a pointing device 818, and/or a touch screen (not shown) to the computer system 800. The keyboard 820 may be an on-screen keyboard displayed on a touch panel. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of the server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 12A:
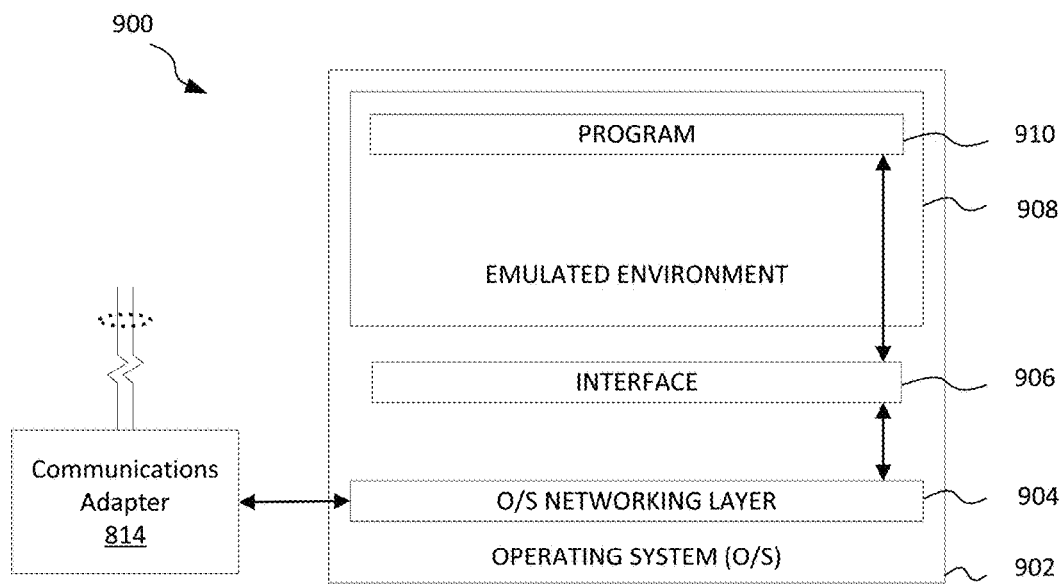
FIG. 12A is a block diagram illustrating a server hosting an emulated software environment for virtualization according to one embodiment of the disclosure.

FIG. 12A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 12B:
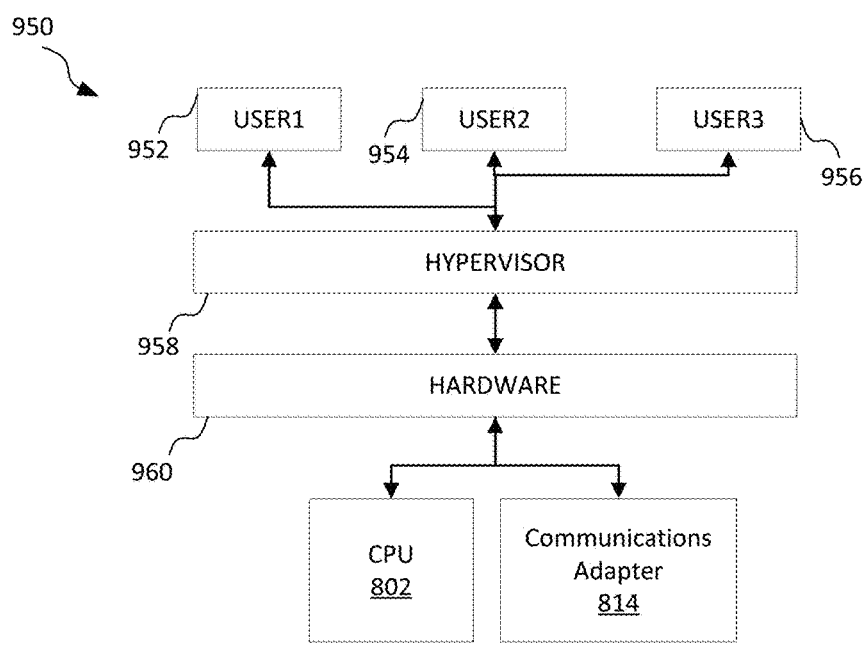
FIG. 12B is a block diagram illustrating a server hosting an emulated hardware environment according to one embodiment of the disclosure.

In another example, hardware in a computer system may be virtualized through a hypervisor. FIG. 12B is a block diagram illustrating a server hosting an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 12A. The hypervisor 958 may provide access to the hardware 960, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CP-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method comprising:
   determining that a quantity of resources on a first host being utilized by one or more containers on the first host is greater than a predetermined utilization quantity;
   determining that there are insufficient unutilized resources on the first host to satisfy the resource utilization of the one or more containers;
   responsive to obtaining an approval:
     imaging a respective container to form a corresponding image;
     copying the image to a second host having sufficient unutilized resources to satisfy the resource utilization of the respective container, wherein the second host is different from the first host; and
     starting the image on the second host; and distributing requests for the respective container on the first host between the respective container and the started image on the second host.

2. The method according to claim 1, further comprising:
scaling down the respective container to accommodate a load balancer;
creating the load balancer, wherein the load balancer is associated with the respective container; and
distributing the requests by the load balancer.

3. The method according to claim 2, further comprising:
mapping the IPaddress:Port of the respective container to the IPaddress:Port of the first host.

4. The method according to claim 2, further comprising:
registering the IPaddress:Port of the respective container with the load balancer.

5. The method according to claim 2, wherein the load balancer is resident on one of the first host and the second host.

6. The method according to claim 1, wherein a load balancer is resident on a network manager, further comprising:
distributing the requests by the load balancer.

7. The method according to claim 1, further comprising:
identifying idle containers and/or stopped containers on the first host;
imaging the idle containers and/or stopped containers on the first host;
removing the idle containers and/or stopped containers and their corresponding images from the first host; and
updating the respective statuses of the removed containers in a registry.

8. The method according to claim 7, wherein at least one of the removed containers is associated with a lease, the method further comprising:
updating the lease associated with the at least one of the removed containers.

9. The method of according to claim 7, further comprising:
identifying one of the removed containers;
identifying a third host that has enough resources to accommodate the identified removed container;
downloading the image and recipes associated with the identified removed container to the identified third host;
starting the identified removed container on the identified third host; and
applying the recipes to the started container.

10. The method according to claim 1, further comprising:
creating a lease object associated with one of the one or more containers;
one of selecting and assigning a lease expiration for the one container;
updating a registry with the lease information; and
tracking the lease expiration.

11. The method according to claim 1, further comprising dynamically reassigning resources available to the one or more containers according to a scaling factor prior to determining that there are insufficient unutilized resources on the first host to satisfy the resource utilization of the one or more containers on the first host.

12. The method according to claim 11, wherein the scaling factor is: (Actual resources required by one of the containers)/(Total resources required by all of the one or more containers)×(Unutilized resources on the first host).

13. The method according to claim 12, wherein the resources are one or more of CPU usage, memory usage, bandwidth usage, and network usage.

14. The method of according to claim 12, wherein an amount of resources is allocated to the one or more containers, and when a quantity of the allocated resources utilized by the one or more containers is less than a lower limit, unused allocated resources are deallocated and added to a free resource pool.

15. The method according to claim 14, wherein the lower limit is 80%.

16. The method according to claim 12, wherein the predetermined utilization quantity is 95%.

17. A computer program product, comprising:
a non-transitory computer-readable medium comprising code for:
determining that a quantity of resources on a first host being utilized by one or more containers on the first host is greater than a predetermined utilization quantity;
determining that there are insufficient unutilized resources on the first host to satisfy the resource utilization of the one or more containers;
responsive to obtaining an approval:
imaging a respective container to form a corresponding image;
copying the image to a second host having sufficient unutilized resources to satisfy the resource utilization of the respective container, wherein the second host is different from the first host; and
starting the image on the second host; and
distributing requests for the respective container on the first host between the respective container and the started image on the second host.

18. The computer program product according to claim 17, wherein the non-transitory computer-readable medium further comprises code for:
dynamically reassigning resources available to the one or more containers according to a scaling factor prior to determining that there are insufficient unutilized resources on the first host to satisfy the resource utilization of the one or more containers on the first host.

19. The computer program product according to claim 18, wherein the scaling factor is: (Actual resources required by one of the containers)/(Total resources required by all of the one or more containers)×(Unutilized resources on the first host).

20. The computer program product according to claim 19, wherein the system resources are one or more of CPU usage, memory usage, bandwidth usage, and network usage.

21. An apparatus, comprising:
a memory;
a network interface; and
a processor coupled to the memory and the network interface, the processor configured to:
determine that a quantity of resources on a first host being utilized by one or more containers on the first host is greater than a predetermined utilization quantity;
determine that there are insufficient unutilized resources on the first host to satisfy the resource utilization of the one or more containers;
in response to obtaining an approval:
image a respective container to form a corresponding image;
copy the image to a second host having sufficient unutilized resources to satisfy the resource utilization of the respective container, wherein the second host is different from the first host; and start the image on the second host; and
distribute requests for the respective container on the first host between the respective container and the started image on the second host.

22. The apparatus according to claim 21, wherein the processor is further configured to:
dynamically reassign resources available to the one or more containers according to a scaling factor prior to determining that there are insufficient unutilized resources on the first host to satisfy the resource utilization of the one or more containers on the first host.

23. The apparatus according to claim 22, wherein the scaling factor is: (Actual resources required by one of the containers)/(Total resources required by all of the one or more containers)×(Unutilized resources on the first host).

* * * * *